US012175924B2

(12) United States Patent
Ha et al.

(10) Patent No.: US 12,175,924 B2
(45) Date of Patent: Dec. 24, 2024

(54) DISPLAY DEVICE AND DRIVING METHOD THEREOF

(71) Applicant: SAMSUNG DISPLAY CO., LTD., Yongin-si (KR)

(72) Inventors: Tae Seok Ha, Yongin-si (KR); Woon Rok Jang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/202,656

(22) Filed: May 26, 2023

(65) Prior Publication Data

US 2024/0062697 A1 Feb. 22, 2024

(30) Foreign Application Priority Data

Aug. 17, 2022 (KR) ........................ 10-2022-0102677

(51) Int. Cl.

*G09G 3/3233* (2016.01)
*G09G 3/32* (2016.01)
*G09G 3/3275* (2016.01)
*G09G 3/20* (2006.01)

(52) U.S. Cl.

CPC ............ *G09G 3/32* (2013.01); *G09G 3/3233* (2013.01); *G09G 3/3275* (2013.01); *G09G 3/2007* (2013.01); *G09G 2310/08* (2013.01); *G09G 2320/0233* (2013.01); *G09G 2320/0247* (2013.01)

(58) Field of Classification Search

CPC ...... G09G 3/3225; G09G 3/3233; G09G 3/32; G09G 3/2007; G09G 3/3275; G09G 2340/0435; G09G 2320/0247; G09G 2320/0233; G09G 2320/0673; G09G 2320/0276; G09G 2320/0626

See application file for complete search history.

(56) References Cited

U.S. PATENT DOCUMENTS 10,839,755 B2 11/2020 Ha et al.
2019/0371250 A1* 12/2019 Baek .................... G09G 3/3291
2022/0270547 A1* 8/2022 Foo .......................... G09G 3/20
2022/0328001 A1 10/2022 Ha et al.
2023/0410723 A1* 12/2023 Park ..................... G09G 3/3233

FOREIGN PATENT DOCUMENTS

EP 4297009 A1 * 12/2023 .............. G09G 3/20
KR 1020190069667 A 6/2019

* cited by examiner

*Primary Examiner* — Xuemei Zheng
(74) *Attorney, Agent, or Firm* — CANTOR COLBURN LLP

(57) ABSTRACT

A display device includes a display unit including pixels, a timing controller which generates output grayscales based on input grayscales by applying a compensation value corresponding to a driving frequency of a previous frame to the input grayscales, and a data driver which generates data voltages corresponding to the output grayscales and supplies the data voltages to the display unit. When the display unit is driven at a first driving frequency, the timing controller corrects the compensation value corresponding to the first driving frequency in a way such that a luminance of the display unit is lowered on a frame-by-frame basis.

18 Claims, 7 Drawing Sheets

DISPLAY DEVICE AND DRIVING METHOD THEREOF

The application claims priority to Korean Patent Application No. 10-2022-0102677, filed on Aug. 17, 2022, and all the benefits accruing therefrom under 35 U.S.C. § 119, the content of which in its entirety is herein incorporated by reference.

BACKGROUND

1. Field

Embodiments of the invention relate to a display device and a driving method thereof.

2. Related Art

With the development of information technology, the importance of display devices, which are a connection medium between users and information, has been emphasized. Accordingly, the use of display devices such as a liquid crystal display device, an organic light emitting display device, or the like has been increasing.

Recently, variable frame mode (for example, Free-Sync mode, G-sync mode, etc.), in which a processor changes a blank section for every frame period to provide frame data to a display device at a variable frame frequency, has been developed. The display device may display an image in synchronization with the variable frame frequency (or a variable frame signal), that is, the display device may drive a display panel at a variable driving frequency.

SUMMARY

In a display device where a display panel is driven at a variable driving frequency, luminance of the display panel driven at a first driving frequency and luminance of the display panel driven at a second driving frequency lower than the first driving frequency may be different from each other. Accordingly, flicker may occur when the driving frequency of the display panel is changed. In particular, the flicker can be easily visually recognized by a user when the driving frequency is reduced.

Embodiments of the invention provide a display device capable of reducing a difference in luminance that occurs when a driving frequency is decreased, and a driving method thereof.

A display device according to embodiments of the invention includes a display unit including pixels; a timing controller which generates output grayscales based on input grayscales by applying a compensation value corresponding to a driving frequency of a previous frame to the input grayscales; and a data driver which generates data voltages corresponding to the output grayscales and supplies the data voltages to the display unit. In such embodiments, when the display unit is driven at a first driving frequency, the timing controller corrects the compensation value corresponding to the first driving frequency in a way such that a luminance of the display unit is lowered on a frame-by-frame basis.

In an embodiment, the timing controller may correct the compensation value corresponding to the first driving frequency every frame.

In an embodiment, a correction amount of the compensation value corresponding to the first driving frequency may be the same or different for each frame.

In an embodiment, the timing controller may correct the compensation value corresponding to the first driving frequency for each frame section including at least two or more frames in a way such that the luminance of the display unit is lowered on a frame section-by-frame section basis.

In an embodiment, a correction amount of the compensation value corresponding to the first driving frequency may be the same or different for each frame section.

In an embodiment, the number of frames included in each frame section may be the same as or different from each other.

In an embodiment, a driving transistor included in each of the pixels may be an N-type transistor, and the timing controller may gradually decrease the compensation value corresponding to the first driving frequency.

In an embodiment, a driving transistor included in each of the pixels may be a P-type transistor, and the timing controller may gradually increase the compensation value corresponding to the first driving frequency.

In an embodiment, the timing controller may correct the compensation value corresponding to the first driving frequency up to a predetermined threshold value.

In an embodiment, when the display unit is driven at a second driving frequency, which is lower than the first driving frequency, the timing controller may maintain the compensation value corresponding to the second driving frequency.

A driving method of a display device according to embodiments of the invention includes generating output grayscales based on input grayscales by applying a compensation value corresponding to a driving frequency of a previous frame to the input grayscales; generating data voltages based on the output grayscales and supplying the data voltages to a display panel; and correcting the compensation value corresponding to a first driving frequency to decrease a luminance of the display panel on a frame-by-frame basis when the display panel is driven at the first driving frequency.

In an embodiment, in the correcting the compensation value, the compensation value corresponding to the first driving frequency may be corrected every frame.

In an embodiment, a correction amount of the compensation value corresponding to the first driving frequency may be the same or different for each frame.

In an embodiment, in the correcting the compensation value, the compensation value corresponding to the first driving frequency may be corrected for each frame section including at least two or more frames.

In an embodiment, a correction amount of the compensation value corresponding to the first driving frequency may be the same or different for each frame section.

In an embodiment, the number of frames included in each frame section may be the same as or different from each other.

In an embodiment, a driving transistor included in each of pixels included in the display panel may be an N-type transistor, and in the correcting the compensation value, the compensation value corresponding to the first driving frequency may be gradually decreased.

In an embodiment, a driving transistor included in each of pixels included in the display panel may be a P-type transistor, and in the correcting the compensation value, the compensation value corresponding to the first driving frequency may be gradually increased.

In an embodiment, in the correcting the compensation value, the compensation value corresponding to the first driving frequency may be corrected up to a predetermined threshold value.

In an embodiment, the driving method of a display device may further include when the display panel is driven at a second driving frequency, which is lower than the first driving frequency, maintaining the compensation value corresponding to the second driving frequency.

BRIEF DESCRIPTION OF THE DRAWINGS

The above and other features of embodiments of the invention will become more apparent by describing in further detail embodiments thereof with reference to the accompanying drawings, in which.

DETAILED DESCRIPTION

Figure 1:
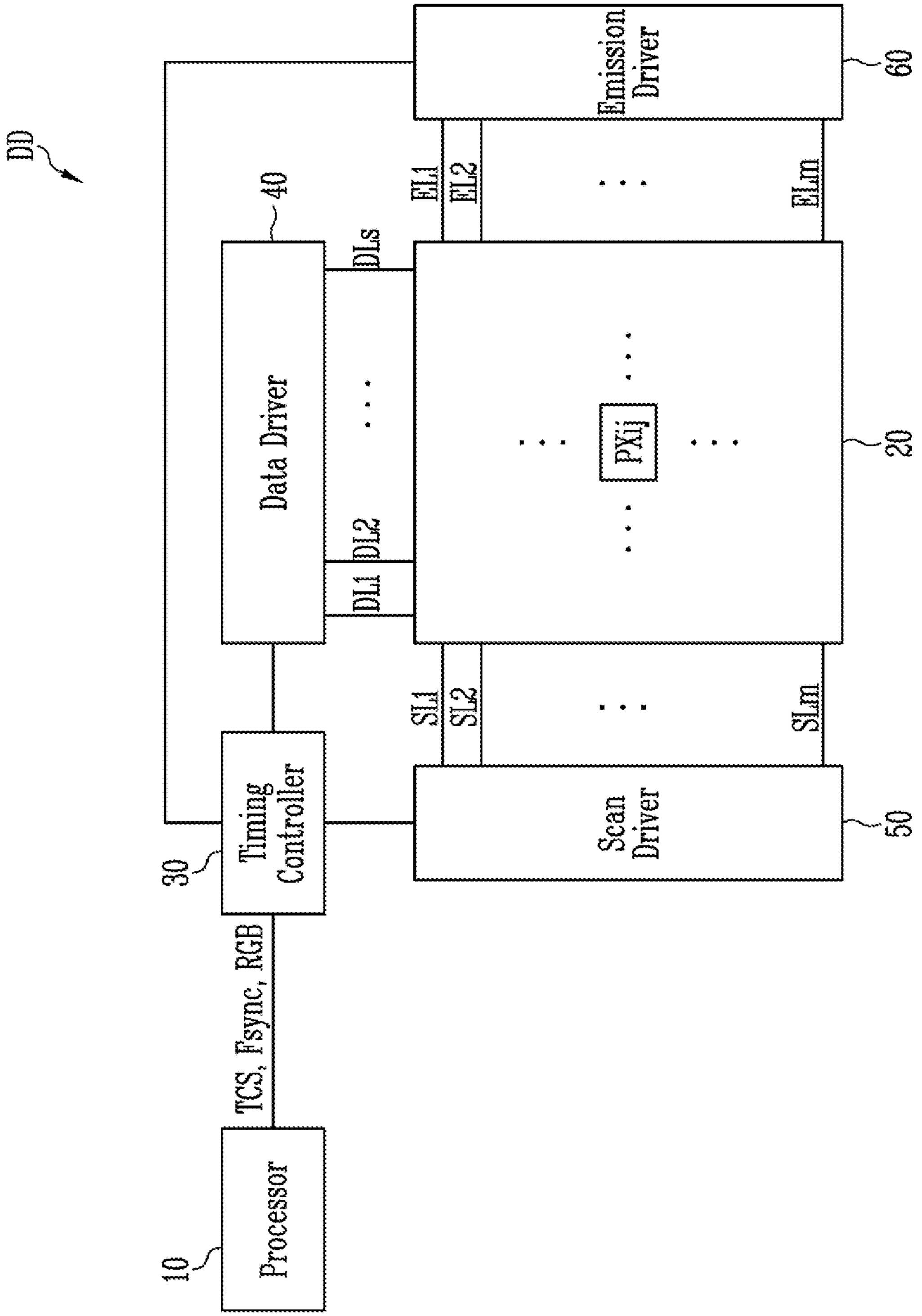
FIG. 1 is a block diagram showing a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In describing the drawings, like reference numerals have been used for like elements. In the accompanying drawings, the dimensions of the structures are enlarged than the actual size in order to clearly explain the invention. It will be understood that, although the terms "first", "second", etc. may be used herein to describe various elements, these elements should not be limited by these terms. These terms are only used to distinguish one element from another element. For instance, a first element discussed below could be termed a second element without departing from the scope of the invention. Similarly, the second element could also be termed the first element.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the following description, when a first part is "connected" to a second part, this includes not only the case where the first part is directly connected to the second part, but also the case where a third part is interposed therebetween and they are connected to each other.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram showing a display device according to an embodiment of the invention.

Referring to FIG. 1, a display device DD according to an embodiment of the invention may include a processor 10, a display unit 20, a timing controller 30, a data driver 40, a scan driver 50, and an emission driver 60.

The processor 10 may include or be defined by a graphics processing unit (GPU), a central processing unit (CPU), an application processor (AP), or the like. The processor 10 may refer to a single integrated circuit (IC) chip or a group defined by a plurality of ICs.

The processor 10 may supply a timing control signal TCS, a variable frequency signal Fsync, and input grayscales RGB.

The timing control signal TCS may include a data enable signal DE (shown in FIG. 2), a vertical synchronization signal, and a horizontal synchronization signal. The data enable signal DE may define an active period ACT, to which the input grayscales RGB are supplied, and a blank period BLK, to which the input grayscales RGB are not supplied, within one frame. The data enable signal DE will be described later in greater detail with reference to FIG. 2.

Timings of the vertical synchronization signal and the horizontal synchronization signal may be varied in response to the variable frequency signal Fsync. The vertical synchronization signal may define the input grayscales RGB in units of frames or on a frame-by-frame basis, and the horizontal synchronization signal may define the input grayscales RGB in units of pixel rows or on a pixel row-by-pixel row basis.

The variable frequency signal Fsync may be a signal indicating that frame frequencies of the input grayscales RGB and the timing control signal TCS are changed for every frame. The frame frequencies of the input grayscales RGB and the timing control signal TCS may vary according to (or to correspond to) the rendering speed of the processor 10.

The display unit 20 (or a display panel) may display an image with a variable driving frequency corresponding to the variable frequency signal Fsync. The driving frequency may be a frequency at which a data voltage is substantially written into a driving transistor of a pixel for 1 second. For example, the driving frequency may be referred to as a screen refresh rate or the like, and may indicate a frequency at which an image is reproduced for 1 second.

The display unit 20 may be driven at a first driving frequency to display a moving image or the like. The first driving frequency may mean a high frequency at which frame data is written with a frequency of 60 hertz (Hz) or higher. Also, the display unit 20 may be driven at a second driving frequency to display a still image or the like. The second driving frequency may mean a low frequency at which frame data is written at a frequency lower than the first driving frequency, that is, less than 60 Hz. The values of the first driving frequency and the second driving frequency may vary based on the variable frequency signal Fsync.

The display unit 20 may include pixels. Each pixel PXij may be connected to a corresponding data line and a corresponding scan line, where i and j may be integers greater than 0. The pixel PXij may mean a pixel whose scan transistor is connected to an i-th scan line and a j-th data line. The pixel PXij will be described later in greater detail with reference to FIG. 3.

The timing controller 30 may receive the timing control signal TCS, the variable frequency signal Fsync, and the input grayscales RGB from the processor 10. The timing controller 30 may determine the driving frequency based on the timing control signal TCS and the variable frequency signal Fsync, and supply control signals corresponding to the driving frequency to the data driver 40, the scan driver 50, and the emission driver 60, respectively.

The timing controller 30 may generate output grayscales by applying a compensation value CV (shown in FIGS. 5 and 6) corresponding to the driving frequency of a previous frame to the input grayscales RGB. When the display device DD is driven at the variable driving frequency, by applying the compensation value CV corresponding to the driving frequency to the input grayscales RGB to change the grayscale values of the output grayscales, a difference in luminance in the display unit 20 due to a change in the driving frequency can be compensated.

In such an embodiment, the timing controller 30 sets the compensation value CV based on the driving frequency of the previous frame rather than the driving frequency of the current frame because the timing controller 30 cannot predict the variable frequency signal Fsync determined in real time by the processor 10.

The compensation value CV may be a set value for compensating for the difference in luminance due to the change in the driving frequency, and may be varied in response to the driving frequency of the previous frame. In an embodiment, for example, the compensation value CV may increase as the driving frequency increases. That is, the compensation value when the driving frequency of the previous frame is the first driving frequency may be greater than the compensation value when the driving frequency of the previous frame is the second driving frequency. Accordingly, the grayscale values of the output grayscales to which the compensation value corresponding to the first driving frequency is applied may be greater than the grayscale values of the output grayscales to which the compensation value corresponding to the second driving frequency is applied.

The timing controller 30 may set the compensation value CV corresponding to the driving frequency of the previous frame by using a memory such as a lookup table in which the compensation value CV is stored.

In an embodiment, when the display unit 20 is driven at the first driving frequency, the timing controller 30 may correct (or change) the compensation value corresponding to the first driving frequency in a way such that the luminance of the display unit 20 is lowered on a frame-by-frame basis. When the driving frequency is changed from the first driving frequency to the second driving frequency, reverse compensation occurs substantially due to the application of the compensation value CV such that flicker due to the difference in luminance of the display unit 20 may not be easily visually recognized.

In an embodiment, for example, where the driving transistor included in each of the pixels is an N-type transistor, the timing controller 30 may gradually decrease the compensation value corresponding to the first driving frequency so that the luminance of the display unit 20 is lowered. In an alternative embodiment, where the driving transistor included in each of the pixels is a P-type transistor, the timing controller 30 may gradually increase the compensation value corresponding to the first driving frequency so that the luminance of the display unit 20 is lowered.

In an embodiment, when the display unit 20 is driven at the second driving frequency, the timing controller 30 may maintain the compensation value corresponding to the second driving frequency. When the driving frequency is changed from the second driving frequency to the first driving frequency, the reverse compensation according to the application of the compensation value CV is insignificant, so that the flicker due to the difference in luminance of the display unit 20 may not be visually recognized, which will be described later with reference to FIGS. 4A to 6.

The data driver 40 may generate the data voltages to be supplied to the display unit 20 using the output grayscales and the control signals. In an embodiment, for example, the data driver 40 may sample the output grayscales using a clock signal and apply the data voltages corresponding to the output grayscales to data lines DL1 to DLs included in the display unit 20, where s may be an integer greater than 0.

The data voltages generated by the data driver 40 may vary based on the driving frequency. In an embodiment, for example, the data voltages corresponding to a same grayscale may increase as the driving frequency increases. That is, the data voltages corresponding to same output grayscales to which the compensation value corresponding to the first driving frequency is applied may be greater than the data voltages corresponding to the same output grayscales to which the compensation value corresponding to the second driving frequency is applied. As the driving frequency increases, a blank period (or an emission period) included in one frame may decrease. This is to prevent a difference in luminance due to a decrease in luminance, which will be described later with reference to FIG. 2.

The scan driver 50 may receive a clock signal, a scan start signal, or the like from the timing controller 30 and generate scan signals to be provided to scan lines SL1 to SLm, where m may be an integer greater than 0.

The scan driver 50 may sequentially supply the scan signals having a turn-on level pulse to the scan lines SL1 to SLm. The scan driver 50 may include scan stages configured in the form of a shift register. The scan driver 50 may generate the scan signals by sequentially transferring the scan start signal in the form of a turn-on level pulse to the next scan stage according to the control of the clock signal.

The emission driver 60 may receive a clock signal, an emission stop signal, or the like from the timing controller 30, and generate emission signals to be provided to emission lines EL1 to Elm, where m may be an integer greater than 0. In an embodiment, for example, the emission driver 60 may include emission stages connected to the emission lines EL1 to Elm. The emission stages may be configured in the form of a shift register. In an embodiment, for example, a first emission stage may generate an emission signal of a turn-off level based on the emission stop signal of a turn-off level, and the remaining emission stages may sequentially generate emission signals of the turn-off level based on the emission signal of the turn-off level of a previous emission stage.

Figure 2:
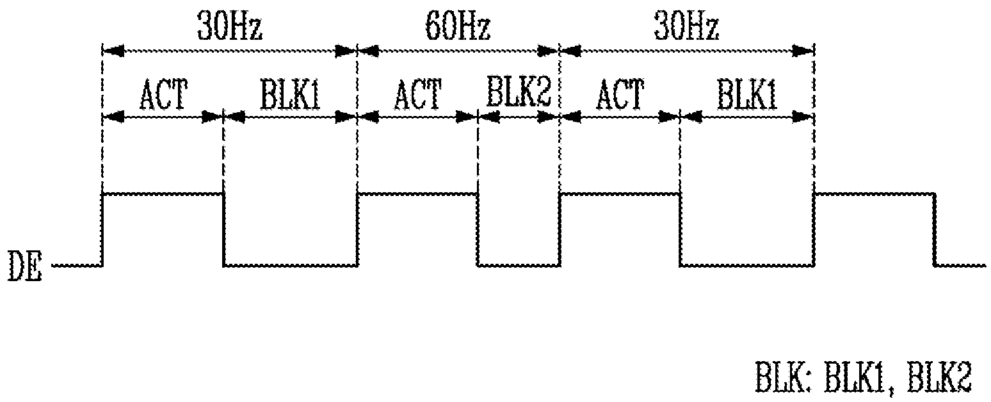
FIG. 2 is a diagram for explaining a data enable signal according to a driving frequency.

FIG. 2 is a diagram for explaining a data enable signal according to a driving frequency. FIG. 2 shows a case where the first driving frequency is 60 Hz and the second driving frequency is 30 Hz as an example.

Referring to FIG. 2, the data enable signal DE may include the active period ACT and the blank period BLK within one frame or for every frame. The active period ACT may correspond to a data writing period in which the input grayscales RGB are written. However, the invention is not limited thereto, and a portion of the active period ACT may correspond to an emission period in which pixels emit light based on data writing. The active period ACT may be the same as each other for each frame regardless of the driving frequency. In an embodiment, for example, active periods ACT when the driving frequency is the first driving frequency (60 Hz) and when the driving frequency is the second driving frequency (30 Hz) may be the same.

The blank period BLK may correspond to the emission period in which pixels emit light according to the input grayscales RGB written in the active period ACT. That is, new input grayscales RGB may not be written in the blank period BLK. The blank period BLK may be determined in real time by the processor 10 and may be different depending on the driving frequency. In an embodiment, for example, a blank period BLK2 when the driving frequency is the first driving frequency (60 Hz) may be shorter than a blank period BLK1 when the driving frequency is the second driving frequency (30 Hz).

When the driving frequency is changed, a difference in luminance may occur due to a difference in the blank period BLK. For example, when the driving frequency is changed from the first driving frequency (60 Hz) to the second driving frequency (30 Hz), as the blank period BLK, that is, the emission period, increases and thus the luminance increases, the difference in luminance may occur. Also, when the driving frequency is changed from the second driving frequency (30 Hz) to the first driving frequency (60 Hz), as the blank period BLK, that is, the emission period, decreases and thus the luminance decreases, the difference in luminance may occur.

Figure 3:
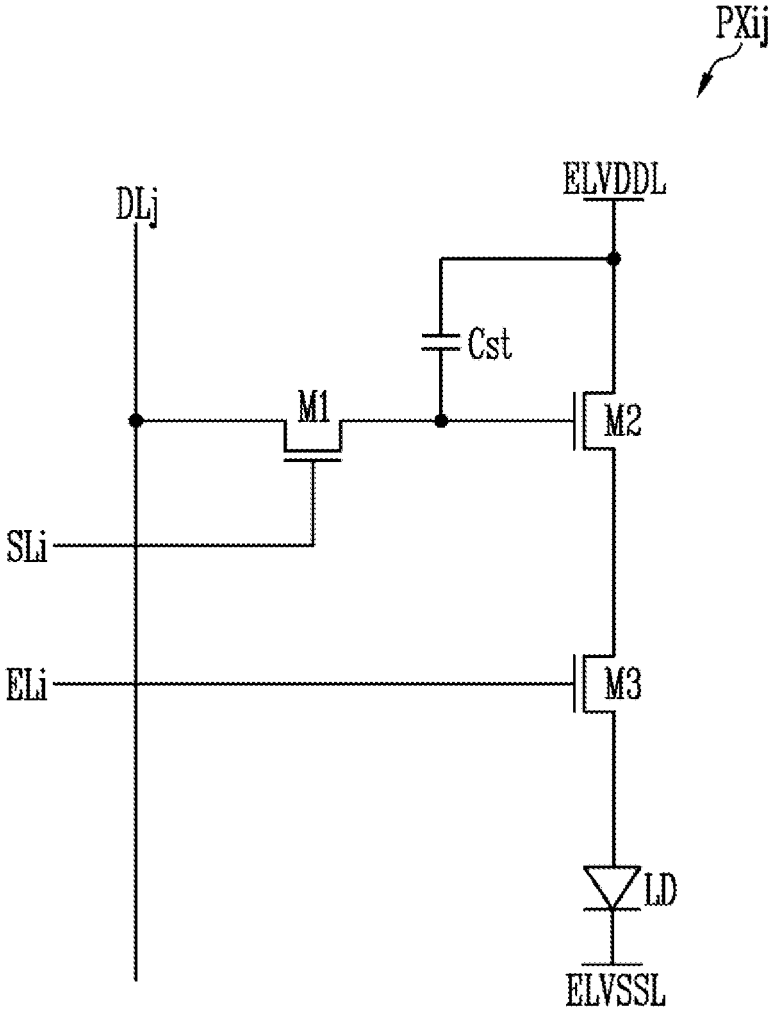
FIG. 3 is a circuit diagram showing a pixel according to an embodiment of the invention.

FIG. 3 is a circuit diagram showing a pixel according to an embodiment of the invention.

Referring to FIG. 3, an embodiment of the pixel PXij may include transistors M1, M2, and M3, a storage capacitor Cst, and a light emitting diode LD.

Hereinafter, an embodiment where pixel PXij is composed of an N-type transistor will be described as an example. However, a person skilled in the art would be able to design a circuit composed of a P-type transistor by changing the polarity of a voltage applied to a gate terminal. Similarly, a person skilled in the art would be able to design a circuit composed of a combination of a P-type transistor and an N-type transistor. The P-type transistor may generally refer to a transistor in which the amount of conducted current increases when a voltage difference between a gate electrode and a source electrode increases in a negative direction. The N-type transistor may generally refer to a transistor in which the amount of conducted current increases when a voltage difference between a gate electrode and a source electrode increases in a positive direction. The transistors may be configured in various forms, such as a thin film transistor (TFT), a field effect transistor (FET), or a bipolar junction transistor (BJT).

A first transistor M1 may include a gate electrode connected to an i-th scan line SLi, a first electrode connected to a j-th data line DLj, and a second electrode connected to a gate electrode of a second transistor M2. The first transistor M1 may be referred to as a scan transistor.

The second transistor M2 may include the gate electrode connected to a first electrode of the storage capacitor Cst, a first electrode connected to a first power source line ELVDDL, and a second electrode connected to a first electrode of a third transistor M3. The second transistor M2 may be referred to as a driving transistor.

The third transistor M3 may include a gate electrode connected to an i-th emission line ELi, the first electrode connected to the second electrode of the second transistor M2, and a second electrode connected to an anode of the light emitting diode LD. The third transistor M3 may be referred to as a control transistor.

The first electrode of the storage capacitor Cst may be connected to the gate electrode of the second transistor M2, and a second electrode of the storage capacitor Cst may be connected to the first electrode of the second transistor M2.

The light emitting diode LD may include the anode connected to the second electrode of the third transistor M3 and a cathode connected to a second power source line ELVSSL. The light emitting diode LD may be composed of or defined by an organic light emitting diode, an inorganic light emitting diode, a quantum dot/well light emitting diode, or the like. FIG. 3 shows an embodiment where the pixel PXij includes a single light emitting diode LD as an example, but not being limited thereto. In an alternative embodiment, the pixel PXij may include a plurality of light emitting diodes connected in series, in parallel, or in series and parallel.

A first power source voltage may be applied to the first power source line ELVDDL, and a second power source voltage may be applied to the second power source line ELVSSL. In an embodiment, for example, during an image display period, the first power source voltage may be greater than the second power source voltage.

When a scan signal of a turn-on level (here, a logic high level) is applied through the scan line SLi, the first transistor M1 may be turned on. In this case, a data voltage applied to the data line DLj may be stored in the first electrode of the storage capacitor Cst. At this time, an emission signal of a turn-off level (here, a logic low level) may be applied through the emission line ELi, and the third transistor M3 may be turned off.

Thereafter, the emission signal of a turn-on level (here, a logic high level) may be applied through the emission line ELi, and the third transistor M3 may be turned on. Accordingly, a positive driving current corresponding to a voltage difference between the first electrode and the second electrode of the storage capacitor Cst may flow between the first electrode and the second electrode of the second transistor M2. As a result, the light emitting diode LD may emit light with a luminance corresponding to the data voltage.

Next, when the scan signal of a turn-off level (here, a logic low level) is applied through the scan line SLi, the first transistor M1 may be turned off, and the data line DLj and the first electrode of the storage capacitor Cst may be electrically isolated. Accordingly, even if the data voltage of the data line DLj is changed, the voltage stored in the first electrode of the storage capacitor Cst may not be changed.

In embodiments, the pixel PXij is not limited that shown in FIG. 3, and may be variously modified.

Figure 4A:
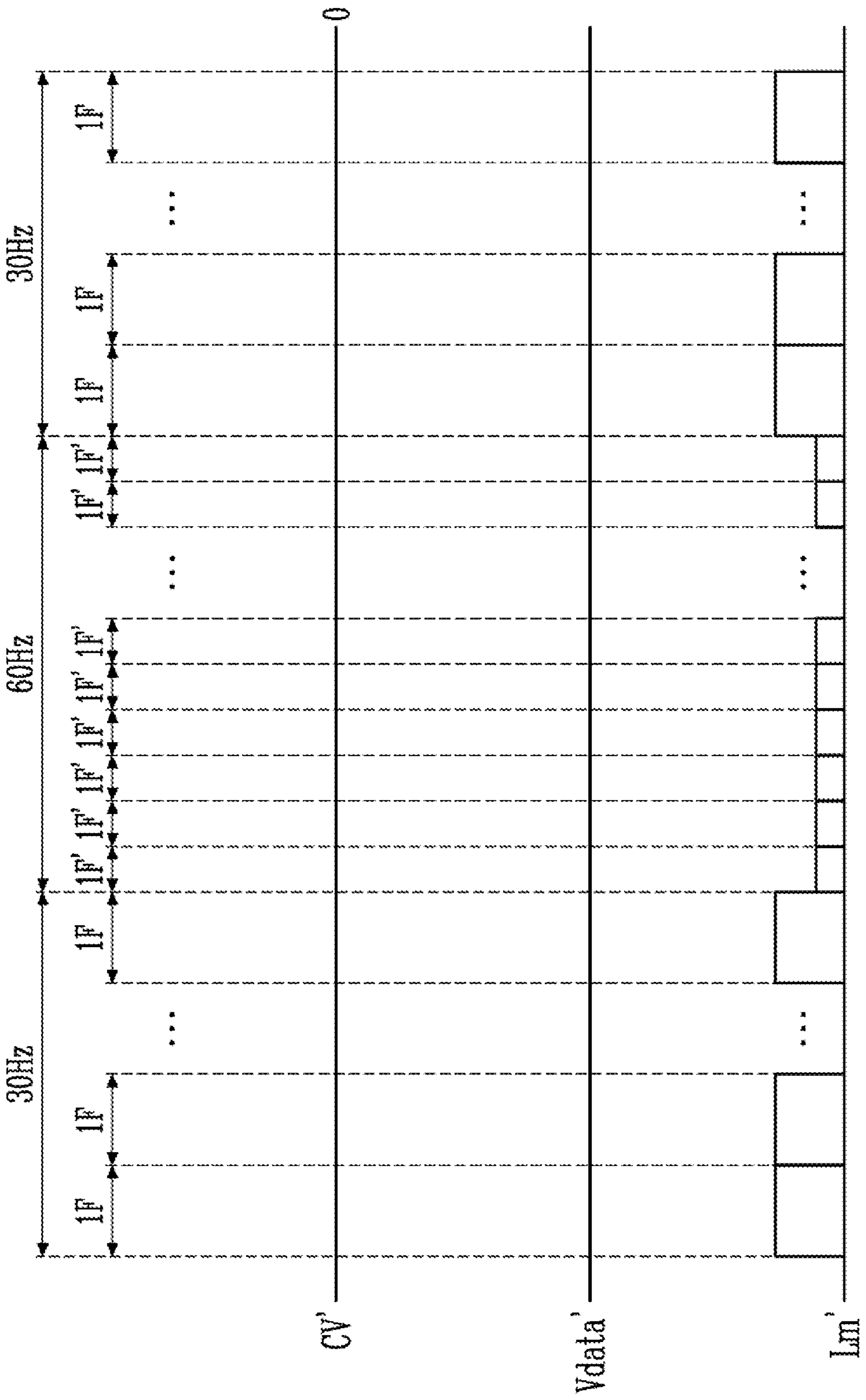
FIG. 4A is a diagram for explaining a data voltage and luminance according to the driving frequency when a compensation value is not applied.

FIG. 4A is a diagram for explaining a data voltage and luminance according to the driving frequency when a compensation value is not applied.

Figure 4B:
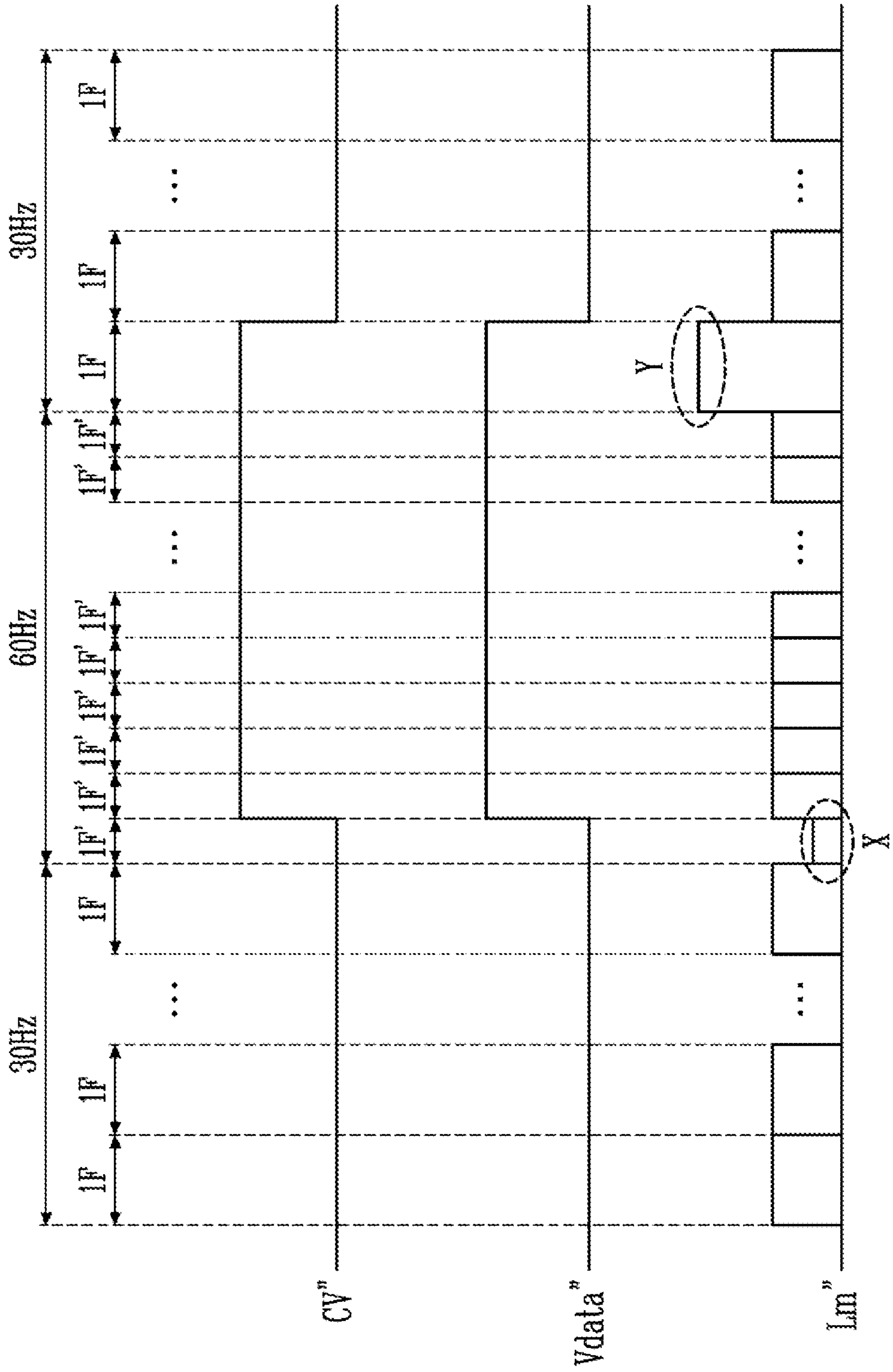
FIG. 4B is a diagram for explaining the data voltage and the luminance according to the driving frequency when the compensation value is applied.

FIG. 4B is a diagram for explaining the data voltage and the luminance according to the driving frequency when the compensation value is applied.

FIGS. 4A and 4B show cases where the first driving frequency is 60 Hz and the second driving frequency is 30 Hz as an example, and each frame period 1F driven at the second driving frequency (30 Hz) may be longer than each frame period 1F' driven at the first driving frequency (60 Hz).

In addition, in FIGS. 4A and 4B, when the data voltage increases, the luminance increases, but the present invention is not limited thereto. For example, when the data voltage increases, the luminance may decrease. That is, the luminance according to the data voltage may vary depending on characteristics of the driving transistor included in each of the pixels.

Referring to FIG. 4A, in a case where a compensation value CV' is not applied to the input grayscales RGB (that is, the compensation value CV' is 0), a data voltage Vdata' may not be compensated, and a difference in luminance may occur as the driving frequency is changed.

For example, when the driving frequency is changed from the second driving frequency (30 Hz) to the first driving frequency (60 Hz), as the blank period included in each frame period 1F' driven at the first driving frequency (60 Hz) is shortened (refer to FIG. 2), the luminance Lm' may decrease, and thus the difference in luminance may occur. In addition, when the driving frequency is changed from the first driving frequency (60 Hz) to the second driving frequency (30 Hz), as the blank period included in each frame period 1F driven at the second driving frequency (30 Hz) becomes longer (refer to FIG. 2), the luminance Lm' may increase, and thus the difference in luminance may occur.

Referring to FIG. 4B, in a case, the difference in luminance due to the change of the driving frequency mentioned in FIG. 4A may be compensated by applying a compensation value CV" corresponding to the driving frequency to the input grayscales RGB in the timing controller 30. In this case, a data voltage Vdata" may be generated by the data driver 40 and may be a voltage corresponding to the output grayscales to which the compensation value CV" is applied to the input grayscales RGB.

For example, when the driving frequency is changed from the second driving frequency (30 Hz) to the first driving frequency (60 Hz), to compensate for a decrease in luminance due to a change in frequency, the timing controller 30 may generate the output grayscales by applying the compensation value corresponding to the first driving frequency (60 Hz) to the input grayscales RGB. That is, when the driving frequency increases, the timing controller 30 may generate the output grayscales by correcting (or increasing) the compensation value CV" to increase the luminance Lm“, and the data driver 40 may generate data voltages Vdata” corresponding to the output grayscales to which the corrected compensation value is applied, thereby compensating for the difference in luminance. In this case, to compensate for the decrease in luminance due to the increase in frequency, the timing controller 30 may increase the luminance Lm" by correcting the compensation value CV" applied to the input grayscales RGB.

In this case, when the driving frequency is changed from the first driving frequency (60 Hz) to the second driving frequency (30 Hz), to compensate for the increase in luminance due to the change in frequency, the timing controller 30 may apply the compensation value corresponding to the second driving frequency (30 Hz) to the input grayscales RGB. That is, when the driving frequency decreases, the timing controller 30 may generate the output grayscales by correcting (or reducing) the compensation value CV", and the data driver 40 may generate reduced data voltages Vdata" corresponding to the output grayscales to which the reduced compensation value is applied, thereby compensating for the difference in luminance. In such an embodiment, to compensate for the increase in luminance due to the decrease in frequency, the timing controller 30 may reduce the luminance Lm" by correcting the compensation value CV" applied to the input grayscales RGB.

In this case, as described above, since the timing controller 30 cannot predict the variable frequency signal Fsync determined in real time by the processor 10, the output grayscales may be generated by applying the compensation value CV" corresponding to the driving frequency of the previous frame to the input grayscales RGB. Accordingly, reverse compensation may occur in a first frame section in which the driving frequency is changed.

For example, in a first frame section X in which the driving frequency is changed from the second driving frequency (30 Hz) to the first driving frequency (60 Hz), since the compensation value corresponding to the second driving frequency (30 Hz), which is the driving frequency of the previous frame, is reflected, the decrease in luminance due to the increase in frequency may not be compensated, and thus reverse compensation, that is, the difference in luminance may occur. However, since the length (that is, the length of 1F') of the first frame section X in which the driving frequency is increased is short and the luminance Lm" is decreased, that is, darkened, the difference in luminance in the first frame section X in which the driving frequency is increased may be difficult to be perceived by a user as flicker.

In this case, in a first frame section Y in which the driving frequency is changed from the first driving frequency (60 Hz) to the second driving frequency (30 Hz), since the compensation value corresponding to the first driving frequency (60 Hz), which is the driving frequency of the previous frame, is reflected, the increase in luminance due to the decrease in frequency may not be compensated, and thus reverse compensation, that is, the difference in luminance may occur. In addition, the length (that is, the length of 1F) of the first frame section Y in which the driving frequency is decreased is long, and in particular, since the emission period becomes longer as the blank period BLK1 (refer to FIG. 2) becomes longer, the difference in luminance may occur. Accordingly, the difference in luminance in the first frame section Y in which the driving frequency is decreased may be easily perceived by the user as flicker.

Figure 5:
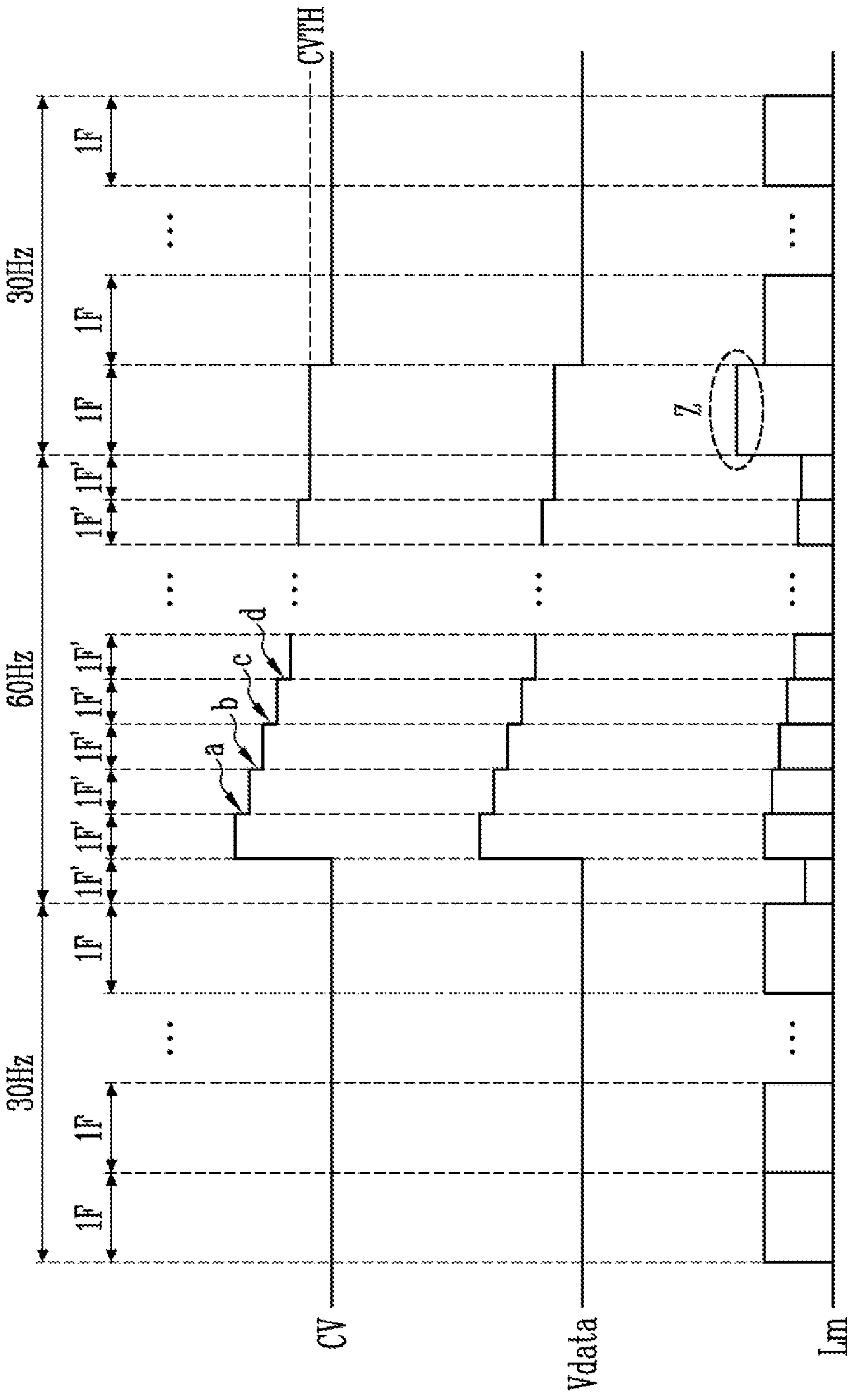
FIG. 5 is a diagram for explaining the data voltage and the luminance according to the driving frequency when the compensation value is applied, according to an embodiment of the invention.

FIG. 5 is a diagram for explaining the data voltage and the luminance according to the driving frequency when the compensation value is applied, according to an embodiment of the invention. FIG. 5 shows a case where the first driving frequency is 60 Hz and the second driving frequency is 30 Hz as an example. FIG. 5 shows an embodiment where the driving transistor included in each of the pixels is an N-type transistor, but the invention is not limited thereto.

Referring to FIGS. 1 and 5, in an embodiment, when the display unit 20 is driven at the first driving frequency (60 Hz), the timing controller 30 may correct the compensation value corresponding to the first driving frequency (60 Hz) in units of frames 1F' so that the luminance Lm is decreased. That is, the timing controller 30 may gradually decrease the compensation value CV in units of frames 1F' while the display unit 20 is driven at the first driving frequency (60 Hz). Accordingly, the grayscale values of the output grayscales generated by the timing controller 30 may be gradually decreased, and the data voltage Vdata generated by the data driver 40 in response to the output grayscales may also be gradually decreased. Accordingly, in a first frame section Z in which the driving frequency is changed from the first driving frequency (60 Hz) to the second driving frequency (30 Hz), since the reduced compensation value is reflected, reverse compensation generated by reflecting the high compensation value (or the compensation value corresponding to the first driving frequency (60 Hz)) of the previous frame, that is, the difference in luminance Lm may be reduced. Accordingly, flicker due to the difference in luminance Lm in the first frame section Z, in which the driving frequency is reduced, may be effectively prevented.

In such an embodiment, in the first frame section in which the display unit 20 is driven at the first driving frequency (60 Hz), since the compensation value corresponding to the second driving frequency (30 Hz), which is the driving frequency of the previous frame, is reflected, the compensation value may not be decreased.

In an embodiment, a correction amount of the compensation value corresponding to the first driving frequency (60 Hz) may be the same or different for each frame unit 1F'. For example, correction amounts (i.e., decreased amount) a, b, c, and d of the compensation values for each frame unit 1F' may be the same as or different from each other. That is, the compensation value corresponding to the first driving frequency (60 Hz) may be gradually decreased by a predetermined amount of correction for each frame unit 1F' or may be gradually decreased by a different amount of correction for each frame unit 1F'.

In an embodiment, the timing controller 30 may correct the compensation value corresponding to the first driving frequency (60 Hz) up to a predetermined threshold value CVTH. The predetermined threshold value CVTH may be a set value to improve the reverse compensation according to a decrease in frequency (that is, change from the first driving frequency (60 Hz) to the second driving frequency (30 Hz)), that is, the difference in luminance Lm and to prevent a sudden decrease in luminance Lm during a period driven at the first driving frequency (60 Hz), and the predetermined threshold value CVTH may be determined or varied by a difference in driving frequency according to a change in frequency. For example, since the reverse compensation, that is, the difference in luminance Lm, increases as the difference in driving frequency according to the change in frequency increases, the predetermined threshold value CVTH may be decreased. In addition, since the reverse compensation, that is, the difference in luminance Lm, decreases as the difference in driving frequency decreases, the predetermined threshold value CVTH may be increased.

Alternatively, when the display unit 20 is driven at the second driving frequency (30 Hz), the timing controller 30 may maintain the compensation value corresponding to the second driving frequency (30 Hz). That is, the timing controller 30 may not change the compensation value CV while the display unit 20 is driven at the second driving frequency (30 Hz). As described above, in the first frame section X in which the driving frequency is changed from the second driving frequency (30 Hz) to the first driving frequency (60 Hz), it can be understood that flicker due to the reverse compensation according to the increase in frequency, that is, the difference in luminance is not easily visually recognized (refer to FIG. 4B).

Figure 6:
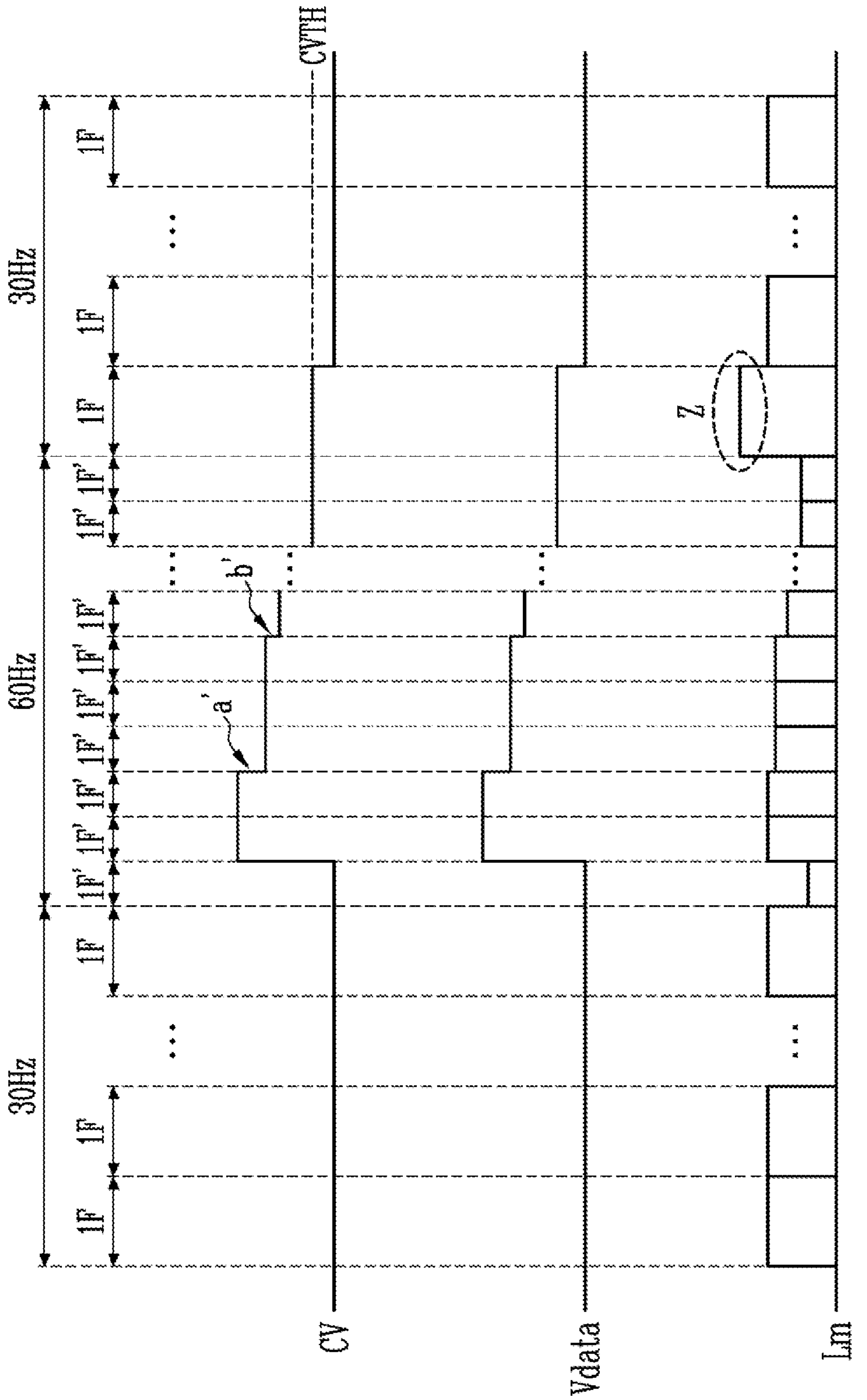
FIG. 6 is a diagram for explaining the data voltage and the luminance according to the driving frequency when the compensation value is applied, according to an alternative embodiment of the invention.

FIG. 6 is a diagram for explaining the data voltage and the luminance according to the driving frequency when the compensation value is applied, according to an alternative embodiment of the invention. FIG. 6 shows a case where the first driving frequency is 60 Hz and the second driving frequency is 30 Hz as an example. FIG. 6 shows an embodiment where the driving transistor included in each of the pixels is an N-type transistor, but the invention is not limited thereto.

Referring to FIGS. 1 and 6, in an embodiment, when the display unit 20 is driven at the first driving frequency (60 Hz), the timing controller 30 may correct the compensation value corresponding to the first driving frequency (60 Hz) for each frame section including at least two or more frames, that is, every two or more frames. That is, the timing controller 30 may gradually decrease the compensation value CV in units of a plurality of frames while the display unit 20 is driven at the first driving frequency (60 Hz). Accordingly, the grayscale values of the output grayscales generated by the timing controller 30 may be gradually decreased, and the data voltage Vdata generated by the data driver 40 corresponding to the output grayscales may also be gradually decreased. Accordingly, deterioration of the pixels due to frequent changes in luminance Lm may be prevented during a period in which the display unit 20 is driven at the first driving frequency (60 Hz), and flicker due to the difference in luminance Lm in the first frame section Z, in which the driving frequency is decreased, may be effectively prevented.

In an embodiment, the correction amount (i.e., decreased amount) of the compensation value corresponding to the first driving frequency may be the same or different for each frame section. For example, the correction amounts a' and b' of the compensation values for each frame section may be the same as or different from each other. That is, the compensation value corresponding to the first driving frequency (60 Hz) may be gradually decreased by a predetermined amount of correction for each frame section or may be gradually decreased by a different amount of reduction for each frame section.

In an embodiment, the number of frames included in each frame section may be the same as or different from each other. In an embodiment, as shown in FIG. 6, the number of frames included in the first frame section in which the compensation value corresponding to the first driving frequency (60 Hz) is maintained may be two, and the number of frames included in a second frame section in which the compensation value reduced by the correction amount a' is maintained may be three. In an alternative embodiment, the number of frames included in the first frame section in which the compensation value corresponding to the first driving frequency (60 Hz) is maintained and the number of frames included in the second frame section in which the compensation value reduced by the correction amount a' is maintained may be the same. That is, a sustain period of each frame section in which the reduced compensation value is maintained may be varied.

According to embodiments of the invention, as described herein, a difference in luminance generated when the driving frequency is decreased may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display unit including pixels;

a timing controller which generates output grayscales based on input grayscales by applying a compensation value corresponding to a driving frequency of a previous frame to the input grayscales; and a data driver which generates data voltages corresponding to the output grayscales and supplies the data voltages to the display unit, wherein when the display unit is driven at a first driving frequency, the timing controller corrects the compensation value corresponding to the first driving frequency in a way such that a luminance of the display unit is lowered on a frame-by-frame basis, and wherein when the display unit is driven at a second driving frequency, which is lower than the first driving frequency, the timing controller maintains the compensation value corresponding to the second driving frequency.

2. The display device of claim 1, wherein the timing controller corrects the compensation value corresponding to the first driving frequency every frame.

3. The display device of claim 2, wherein a correction amount of the compensation value corresponding to the first driving frequency is the same or different for each frame.

4. The display device of claim 1, wherein the timing controller corrects the compensation value corresponding to the first driving frequency for each frame section including at least two or more frames in a way such that the luminance of the display unit is lowered on a frame section-by-frame section basis.

5. The display device of claim 4, wherein a correction amount of the compensation value corresponding to the first driving frequency is the same or different for each frame section.

6. The display device of claim 4, wherein the number of frames included in each frame section is the same as or different from each other.

7. The display device of claim 1, wherein a driving transistor included in each of the pixels is an N-type transistor, and the timing controller gradually decreases the compensation value corresponding to the first driving frequency.

8. The display device of claim 1, wherein a driving transistor included in each of the pixels is a P-type transistor, and the timing controller gradually increases the compensation value corresponding to the first driving frequency.

9. The display device of claim 1, wherein the timing controller corrects the compensation value corresponding to the first driving frequency up to a predetermined threshold value.

10. A driving method of a display device, the driving method comprising:

generating output grayscales based on input grayscales by applying a compensation value corresponding to a driving frequency of a previous frame to the input grayscales;

generating data voltages based on the output grayscales and supplying the data voltages to a display panel;

correcting the compensation value corresponding to a first driving frequency to decrease a luminance of the display panel on a frame-by-frame basis when the display panel is driven at the first driving frequency; and when the display panel is driven at a second driving frequency, which is lower than the first driving frequency, maintaining the compensation value corresponding to the second driving frequency.

11. The driving method of claim 10, wherein in the correcting the compensation value, the compensation value corresponding to the first driving frequency is corrected every frame.

12. The driving method of claim 11, wherein a correction amount of the compensation value corresponding to the first driving frequency is the same or different for each frame.

13. The driving method of claim 10, wherein in the correcting the compensation value, the compensation value corresponding to the first driving frequency is corrected for each frame section including at least two or more frames.

14. The driving method of claim 13, wherein a correction amount of the compensation value corresponding to the first driving frequency is the same or different for each frame section.

15. The driving method of claim 13, wherein the number of frames included in each frame section is the same as or different from each other.

16. The driving method of claim 10, wherein a driving transistor included in each of pixels included in the display panel is an N-type transistor, and in the correcting the compensation value, the compensation value corresponding to the first driving frequency is gradually decreased.

17. The driving method of claim 10, wherein a driving transistor included in each of pixels included in the display panel is a P-type transistor, and in the correcting the compensation value, the compensation value corresponding to the first driving frequency is gradually increased.

18. The driving method of claim 10, wherein in the correcting the compensation value, the compensation value corresponding to the first driving frequency is corrected up to a predetermined threshold value.

* * * * *